United States Patent [19]
Niksa et al.

[11] Patent Number: 4,788,764
[45] Date of Patent: Dec. 6, 1988

[54] METHOD OF MAKING A UNITIZED ELECTRODE ASSEMBLY

[75] Inventors: Marilyn J. Niksa, Painesville; Gerald R. Pohto; Leslie K. Lakatos, both of Mentor; Douglas J. Wheeler, Cleveland Heights, all of Ohio; Frank Solomon, Great Neck, N.Y.; Andrew J. Niksa, Painesville; Thomas J. Schue, Huntsburg, both of Ohio; Yury Genodman, Brooklyn, N.Y.; Thomas R. Turk, Mentor; Daniel P. Hagel, Willoughby, both of Ohio

[73] Assignee: Eltech Systems Corporation, Boca Raton, Fla.

[21] Appl. No.: 149,037

[22] Filed: Jan. 26, 1988

Related U.S. Application Data

[62] Division of Ser. No. 64,352, Jun. 22, 1987, Pat. No. 4,756,480, which is a division of Ser. No. 838,484, Mar. 11, 1986, Pat. No. 4,693,946.

[51] Int. Cl.4 .............................................. B23P 19/00
[52] U.S. Cl. ..................................... 29/731; 29/623.1
[58] Field of Search ...................... 29/730, 731, 623.1, 29/623.4; 72/46; 429/209, 27, 28

[56] References Cited

U.S. PATENT DOCUMENTS

| 3,457,113 | 7/1969 | Dieberg | 429/13 |
|---|---|---|---|
| 3,457,115 | 7/1969 | Kent | 429/28 |
| 3,518,123 | 6/1970 | Katsoulis et al. | 429/28 |
| 3,533,845 | 10/1970 | Katsoulis | 429/27 |
| 3,598,655 | 8/1971 | Hamlen et al. | 429/27 |
| 3,607,422 | 9/1971 | Moran | 429/28 |
| 3,682,706 | 8/1972 | Yardney et al. | 429/27 |
| 3,759,748 | 9/1973 | Palmer | 429/28 X |
| 4,115,626 | 9/1978 | Sauer et al. | 429/27 |
| 4,246,324 | 1/1981 | de Nora et al. | 429/17 |
| 4,354,958 | 10/1982 | Solomon | 252/425.3 |
| 4,379,034 | 4/1983 | Rogers | 204/98 |
| 4,379,077 | 4/1983 | Solomon | 252/444 |
| 4,551,399 | 11/1985 | Despic | 429/27 |

OTHER PUBLICATIONS

"Design Characteristics of an Aluminum-Air Battery with Consumable Wedge Anodes", Journal of Applied Electrochemistry 15(1985) 191-200.
"Aluminum-Air Power Cell", A Progress Report, A. Maimoni, submitted to Twentieth IECEC '85 Conference, Miami Beach, Florida.

Primary Examiner—Anthony Skapars
Attorney, Agent, or Firm—John J. Freer

[57] ABSTRACT

A battery assembly of the consumable metal anode type has now been constructed for ready assembly as well as disassembly. In a non-conductive and at least substantially inert cell body, space is provided for receiving an open-structured, non-consumable anode cage. The cage has an open top for facilitating insertion of an anode. A modular cathode is used, comprising a peripheral current conductor frame clamped about a grid reinforced air cathode in sheet form. The air cathode may be double gridded. The cathode frame can be sealed, during assembly, with electrolyte-resistant-sealant as well as with adhesive. The resulting cathode module can be assembled outside the cell body and readily inserted therein, or can later be easily removed therefrom.

2 Claims, 6 Drawing Sheets

METHOD OF MAKING A UNITIZED ELECTRODE ASSEMBLY

This invention was made with Government support under Contract No. W-7405-ENG-48 awarded by the Department of Energy. The Government has certain rights in this invention.

Tis is a division of application Ser. No. 64,352, filed June 22, 1987, now U.S. Pat. No. 4,756,980, which in turn is a division of application Ser. No. 838,484, filed Mar. 11, 1986, now U.S. Pat. No. 4,693,946.

BACKGROUND OF THE INVENTION

It has been useful to Prepare cathodes, often known as air cathodes, by using mixtures of carbon black with a polymeric binder and to prepare such materials in sheet form. The sheet can also include activated material. Thus, for example, in U.S. Pat. No. 4,354,958 it has been shown to make an active layer for an electrode of improved strength that can contain carbon black and fibrillated polytetrafluoroethylene particles, which electrode can be activated by platinum catalyzed active carbon particles. This active layer is laminated to a backing layer and the laminate may serve as an active electrode.

It has also been known to prepare these laminated electrodes by having screens pressed into the surface of the laminate. As disclosed in U.S. Pat. No. 3,457,113, one screen can be used with the active layer and another screen with the backing layer.

Or the carbon electrode might be pressed against a conductive foil and a separator in a battery arrangement using a consumable electrode, e.g., zinc plate electrode. In U.S. Pat. No. 4,115,626 there is shown a representative cell. To Provide interconnected elements the zinc electrode is enclosed in a synthetic plastic frame.

It has also been found useful to provide electrolyte-absorbing layers as Part of the interconnected layers in a battery construction. For example, in U.S. Pat. No. 3,598,655 such absorbing layers are shown to be useful between a consumable metal anode plate and a planar cathode comprising a coated screen. As shown most particularly by the patent drawing, essentially all of the battery elements can be bound into a casing. Or as disclosed in U.S. Pat. No. 3,518,123, a casing can support electrodes wherein the consumable electrode may be wrapped in an inert, non-consumable material. The construction will ostensibly retard premature dehydration of the battery.

More recently in U.S. Pat. No. 4,246,324 box-like forms have been used with electrodes being on opposing faces of the form. Electrolyte is maintained between the facing electrodes and the consumable anode can be of plate shape, for example held in place on the box wall by spring clips. Then in U.S. Pat. No. 4,551,399, the anodes are shown tapered and adjacent structure includes slotted walls and cathodes with alternating spaces and projections.

It has also recently been shown in U.S. Pat. No. 4,551,399 that the cathode can be mounted on arms, and the arms wired. The arms can then penetrate through a separator wall and thereby be in contact with an anode on the far side of the wall. The anode may be wedge shaped with the backside conforming with the straight separator wall and the angled side being in a plane parallel to the plane of the cathode.

It has also been proposed to affix a cathode having surface screen reinforcement to a cell body by using combination techniques including welding and application of adhesive to thereby adhere the grid to the cell body. To further tighten the seal, intrusive members, e.g., screws, have also been taught to be useful.

In all such structures there is however still considerable room for improvement for providing elements tightly sealed, yet maintaining good electrical contact. It would also be desirable to provide interconnected structure, all of which can be readily inserted and removed, e.g., for repair, without damage or loss to closely associated cell members. It would furthermore be most desirable to couple this with enhanced start-up of operation.

There has already been discussed in U.S. Pat. No. 4,379,034 the potential for undesirable start-up of an oxygen electrode which is overcome by a break-in procedure. However, it would still be desirable to obtain a most economical start-up approaching realistic operation. This could help obviate a break-in procedure, i.e., a reduced electrolyte flow and low current density procedure, that may be coupled with a lower than normal oxygen flow rate.

SUMMARY OF THE INVENTION

There has now been constructed a battery assembly having highly desirable ease of assembly as well as disassembly, more particularly in which cathode modules can be assembled outside the cell and thereby readily removed or reinserted as needed. The modules combine a highly desirable seal against electrolyte together with excellent electrical contact. The anode support structure likewise lends itself to ease of assembly as well as ease of anode insertion, or ease of anode feed on anode dissolution during cell operation, or even of anode removal from the cell if desired. The anode assembly can now be utilized to readily provide a desirable close anode-cathode gap relationship. All of the assembly is achieved without recourse to complex, time consuming steps. Moreover, no expensive or heavy and cumbersome elements are required. Furthermore, the foregoing can be obtained in combination with cell start-up approaching more realistic operation and without recourse to careful control over cell operating parameters.

In one broad aspect, the invention relates to a battery of the consumable metal anode type adapted for ready assembly as well as disassembly, the battery comprising: a non-conductive cell container resistant to cell electrolyte; a unitized framed gas-diffusion cathode with porous sheet cathode member, foraminous metal conductor member impressed against such sheet cathode member, and conductive metal frame positioned around the peripheral edges of the sheet cathode member and conductor member; an anode cage in the cell container and having cage frame members at least in part compressed against the frame of the cathode; and with the anode cage and unitized frame cathode being independently removable upon compression release and reinsertable in the non-conductive cell container.

In the aspect of the anode cage, the invention relates to a non-consumable, open-topped cage, at least substantially V-shaped in cross-section. The cage has a lower frame cross-member extending along the base of the V, at least two upper frame cross-members, spaced apart from one another for providing the open top of the cage, each upper frame cross-member extending along a top edge of such cage, parallel to one another and to the lower frame cross-member, and cage bars s aced apart one from the other and joining the upper frame cross-members to the lower frame cross-member.

In the aspect of the unitized electrode module, or the "unitized, framed gas-diffusion cathode", the invention relates to a module being adapted for assembly external to a cell body and for subsequent containment within such cell body by mechanical means without metallurgical bonding, as well as being readily insertable and removable from the body. More particularly, the module comprises: a porous sheet gas-diffusion electrode member of at least substantially planar shape; a foraminous metal conductor member of at least substantially planar shape, such conductor member being pressed in electrically conductive contact against a planar face of the sheet electrode member; a conductive metal frame around the periphery of both the sheet electrode member and conductor member, with frame edges tightened around the edges of the sheet electrode and conductor members in tight, electrically-conductive contact therewith, thereby providing a firm mechanical bond between such conductor member, sheet electrode member and frame; and non-conductive, electrolyte-resistant sealant between the edges of the metal frame for assisting in a liquid tight seal.

In a specific important aspect of the invention, the cathode module can have a reinforced sheet electrode serviceable for use as an air cathode, such electrode comprising a thin, single sheet layer of catalyzed carbon particles, in mixture with 10 to 50 weight percent of hydrophobic polymeric binder containing fluorocarbon polymer, the layer being free from hydrophilic bulk metal internal to such sheet, while having on both the front and back flat surfaces of the single sheet layer a current-conductive, foraminous metal mesh exposed at, but in pressed embedment in, the sheet surface, with each foraminous metal mesh being sintered to the sheet at elevated temperature.

In a yet further specific important aspect of the invention, the cathode module can have a quick-start electrode especially for use as an oxygen cathode, such electrode comprising a thin sheet layer of catalyzed carbon black particles having particle diameters within the range of from about 0.01 micron to about 0.1 micron, such carbon black being in mixture with from about 10 to about 50 weight percent of hydrophobic polymeric binder, such thin sheet layer having a coating on its electrolyte-facing surface of a catalyzed carbon having particle diameters within the range of from about 1 micron to about 10 microns and a surface area of from about 500 to about 1500 square meters per gram, in mixture with from about 15 to about 25 weight percent of particulate hydrophobic polymeric binder containing particulate fluorocarbon polymer having particle size diameter of about 0.2 micron, such coating having from about 5 to about 15 weight percent, basis weight of the coating, of catalyst.

The invention also specifically relates to a non-conductive cell body section for receiving an air cathode. Such cell body section comprises: a planar surface for facing relationship with an air cathode but spaced apart therefrom. The cell body section has an air inlet plenum along an edge of the planar surface connected with air supply means, with the inlet plenum having an air feed aperture extending uniformly and at least substantially along the length of the edge of such surface. This inlet plenum provides for an air feed to the planar surface uniformly along the length of the air feed aperture. The cell body section further has an air exhaust plenum along an edge of the planar surface at an edge opposite the air feed aperture and connected with air exhaust means. This exhaust plenum has an air exhaust outlet corresponding in size and shape to, and positioned in parallel relationship with, such air feed aperture, whereby air flowing over the planar surface sweeps into the exhaust outlet. The cell body section also has a series of parallel, spaced apart air channeling elements across the face of the planar surface and extending at least substantially from the air feed aperture to the air exhaust aperture, which elements can assist air flow across the planar surface in unobstructed manner. This air enters from the air feed aperture and flows over the planar surface and along the air channeling elements, then exits through the air exhaust outlet.

The invention furthermore relates to the method of making a unitized electrode assembly, which assembly is resistant to liquid penetration and comprises a metal frame for enclosing the peripheral edge of an electrode in planar sheet form, which method comprises: establishing a metal frame member having raised edge projections around the frame perimeter, such projections having breaks at frame corners, with the frame member conforming in shape to the peripheral edge of the electrode in sheet form; placing the electrode in sheet form in the frame member with the peripheral edge of the sheet being placed nearly adjacent such raised edge projections; taping the electrode with electrolyte-resistant tape at the corner breaks; applying a bead of electrolyte-resistant sealant within the frame member along the base of the raised edge projections; and crimping such raised edge projections down into firm contact with the electrode tape and sealant.

In yet other aspects, the invention pertains to a specifically defined bar for an anode cage and its angle of placement in the cage, as well as to particular height considerations for the anode cage lowermost cross-member and the adjacent frame member for the cathode module in a cell. Moreover, the invention methods are in part directed to joining a modular cathode to a cell body as well as to the method of preparing reinforced sheet cathode members of enhanced strength.

DESCRIPTION OF THE PREFERRED EMBODIMENTS

Figure 1:
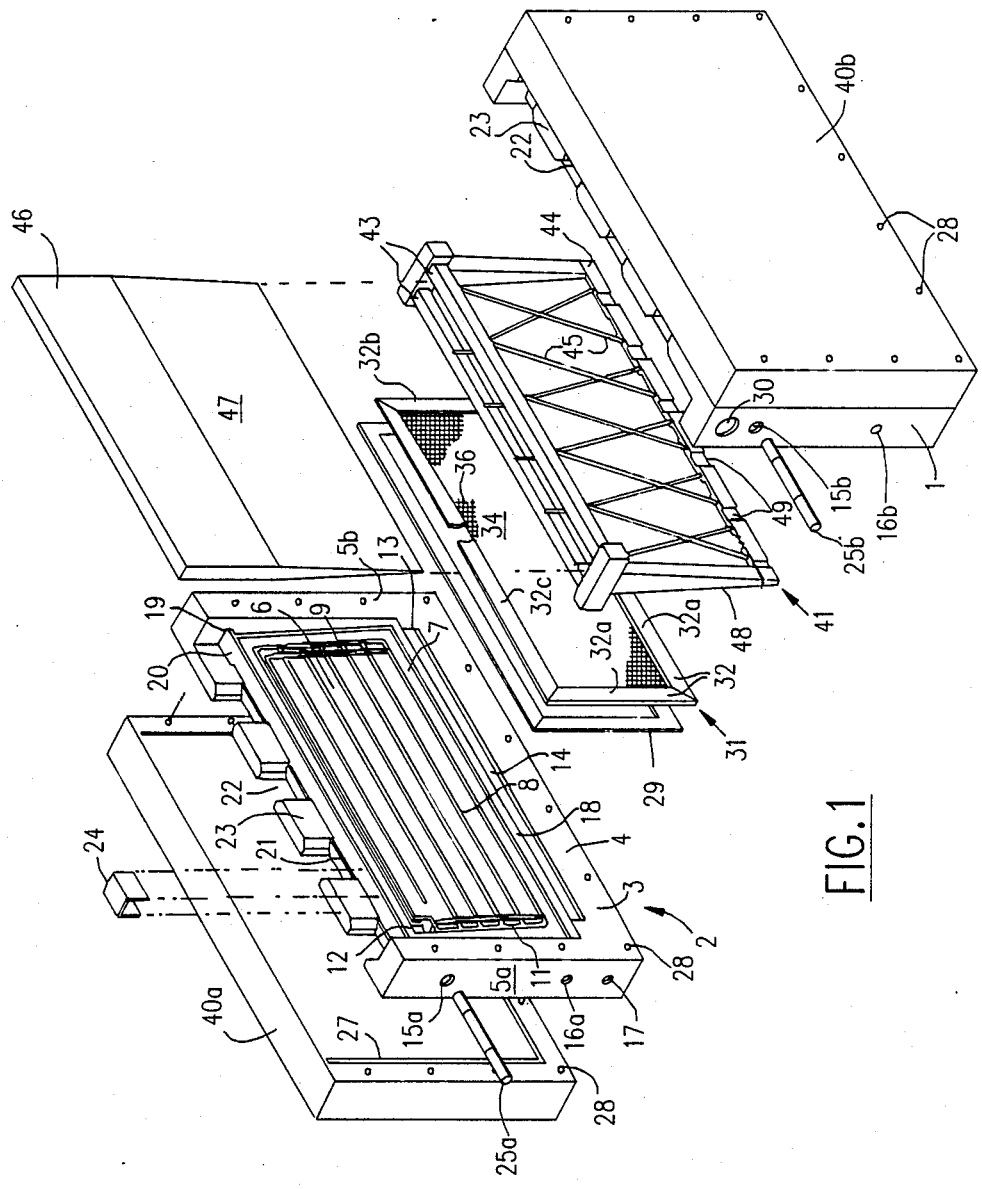
FIG. 1 is an exploded view showing a cell unit, including anode and cathode assemblies.

Referring to FIG. 1, a cell body section shown generally at 2 has an outer frame member 3 extending in a general U-shape. This U-shaped frame member 3 has a bottom cross-member 4 which connects between two outer frame posts 5a, 5b. Also, between the posts 5a, 5b on the front of the cell body section 2 is a wall-like face 6 which forms the back of a cathode chamber and is angled to the vertical and surrounded circumferentially by a recessed groove 7. The groove 7 and face 6 substantially occupy the area of the frame member 3 between the posts 5a, 5b. This face 6 is angled from the vertical so as to be slightly angled from the posts 5a, 5b.

Extending across the face 6 are air directional or channeling elements 8, shown as ridges, which essentially extend from an air plenum chamber inlet 9 to an opposite and parallel air plenum chamber outlet 11. Also located on the face 6, at a corner thereof is a lug recess 12 to receive a cathode lug, not shown. The bottom frame cross-member 4 has an electrolyte feed slot 13 extending substantially along the length of the cross-member 4. The feed slot 13 opens at the front of the cell body section 2 to a recessed electrolyte feed depression 14 in the cross-member 4, through which electrolyte flows.

Through one post 5a there extends an aperture 15a providing access for a cathode current take off stud 25a. The post 5a also has an air exhaust port 16a connecting to an air cavity or plenum, not shown, which cavity or plenum has an outlet 11 on the wall-like face 6. Post 5a further contains an electrolyte inlet 17 connecting to a feed conduit or plenum, not shown, behind the electrolyte feed slot 13. Through the posts 5a, 5b and the bottom cross-member 4 are apertures 28 for tie bolts, not shown Above the recessed depression 14 in the bottom cross-member 4 there is a lower ledge 18 which abuts the bottom edge of a cathode module. When in place, the upper frame portion of the cathode module is in place under an upper ledge 19. On the top face 20 of the upper ledge 19, slots 21 are provided for receiving cathode securing means 24. Rearwardly of the upper ledge 19, overflow channels 22 are positioned between upright post or flange members 23.

Positioned behind the frame member 3 is a bulkhead 40a containing an O-ring 27 in a recessed groove of the bulkhead 40a. The bulkhead 40a also contains apertures 28 for tie bolts, not shown.

For positioning in the recessed groove 7 of the cell body section 2 there is provided a cathode gasket 29. Fitting snuggly against the cathode gasket 29 is the frame of a modular cathode shown generally at 31, and which may also be referred to herein as the "modular air cathode" or the "framed gas-diffusion cathode". The modular cathode 31 has a frame 32 which has front, upright frame edges 32a,b, as well as a connecting frame top edge 32c, shown partially in section, and frame bottom edge 32d, and similar back edges, not shown. These edges 32a,b,c and dare formed around a sheet cathode 34, which is almost always a carbon/polyfluorocarbon matrix and which may also be referred to herein as the "porous sheet cathode" or the "gas-diffusion cathode". The sheet cathode 34 is shown partially in section to expose a foraminous metal support member 36, or grid. The metal support member 36 is in forced, partial embedment in the surface of the sheet cathode 34. When the modular cathode 31 is slightly angled to the vertical and placed within the cell body section 2, the sheet cathode 34 is in face-to-face relationship with the face 6 of the cell body 2, and slightly spaced apart therefrom, whereby the face 6 forms the back of the cathode chamber.

As also shown in FIG. 1, an open-topped anode cage, shown generally at 41, is adjacent the modular cathode 31. This anode cage 41 is V-shaped in cross-section with V-shaped end sections 48. This cage 41 has two upper parallel frame cross-members 43, spaced apart one from the other and each extending along a top edge of the anode cage 41 between the end sections 48. At the bottom of the anode cage 41 the end sections 48 are connected with a lower frame cross-member 44. This lower frame cross-member 44 extends along the bottom portion of the anode cage 41, parallel with the upper frame cross-members 43. This lower cross-member 44 can serve as a feed manifold for incoming electrolyte and therefore contains notches 49 along its length, staggered on each side of the cross-member 44. Between the lower cross-member 44 and each upper frame cross-member 43 are a series of cage bars or rods 45.

This assembly of upper frame cross-members 43, end sections 48, cage bars 45 and lower cross-member 44 provides the anode cage 41 in which a consumable metal anode 46 may be inserted. This wedge-shaped anode 46 has two generally broad faces 47 each of which will be in face-to-face relationship with a sheet cathode 34 of a modular cathode 31. The anode faces 47 engage the cage bars 45, whereby these bars 45 fix the electrolyte gap between the anode face 47 and the sheet cathode 34. The lower cross-member 44 and the end sections 48, serving as compression members, provide for critical sealing of the modular cathode 31, as will be more fully discussed hereinbelow. The generally V-shape cross-section of the anode cage 41 provides an angle in conformance with the slant of the face 6 of the cell body section 2. Hence this face 6, modular cathode 31 and anode face 47 are maintained in at least substantially parallel, planar facing relationship. This relationship might be at an angle from the vertical as slight as about 2°-5°, or as great as 30° or even more, but most typically the face 6 will be angled from the vertical within the range of from about 3° to about 25°.

As further shown in FIG. 1, a second cell body section 1, which can already contain a cathode gasket and modular cathode, both not shown, is in abutment against a bulkhead 40b. This bulkhead 40b contains apertures 28 for tie bolts. The cell body section 1 has an aperture 30 through which electrical connection can be made to the anode cage 41. The cell body section 1 also has a lug access aperture 15b through which a cathode current take-off stud 25b is inserted for connection with a cathode lug, not shown. The cell body section 1 further has an air exhaust port 16b as well as upright post members 23 and electrolyte overflow channels 22.

Figure 2:
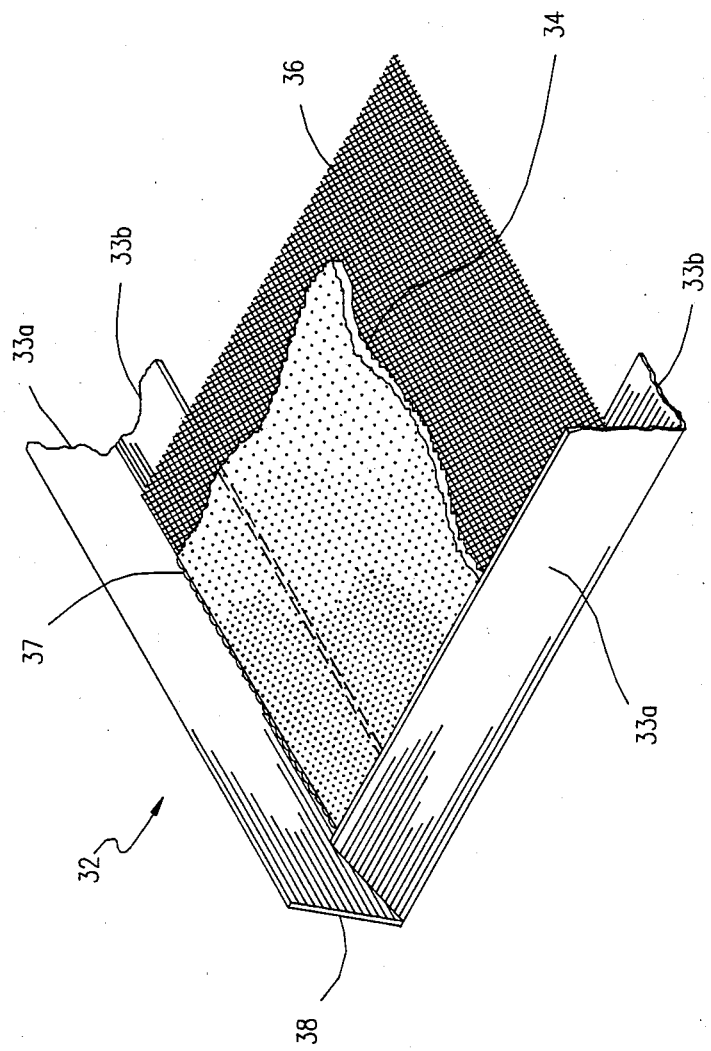
FIG. 2 shows a corner portion only, and in section, of a cathode module before frame crimping.

Referring then to FIG. 2, there is depicted a portion of a cathode frame shown generally at 32, the frame being an open frame in partial assembly, being prepared for final assembly, such as by a folding operation. At its periphery, the cathode frame 32 has upright frame edges, or projections, 33a and in connection therewith at right angles thereto and in the main plane of the frame has edges 33b, referred to also herein as horizontal frame edges 33b. Resting on the horizontal frame edges 33b is a sheet cathode 34 and grid 36, both shown in partial section The cathode 34 and grid 36 extend along the horizontal frame edges 33b essentially to their intersection with the upright frame edges 33a. At the periphery of the cathode 34 and grid 36, a bead of sealant 37 is overlaid thereon. At the corner of the frame edges 33a an adhesively backed tape, not shown, may also be placed over both the cathode 34 and grid 36 to assist in obtaining a liquid tight seal.

When the upright frame edges 33a are pressed down toward contact with the horizontal frame edges 33b the sealant 37 is compressed between the joining edges 33a and 33b. This sealant 37, together with any adhesively backed tape, provides an air and liquid-resistant seal between the edges 33a and 33b along the periphery of the cathode frame 32. A corner edge break 38 is provided between the upright frame edges 33a and 33b so as to provide a mitered corner after crimping together these frame edges 33a and 33b. After the crimping, the frame edges 33a, 33b can therefore serve as a balanced current distributor around the entire periphery cf the cathode 34.

Figure 3:
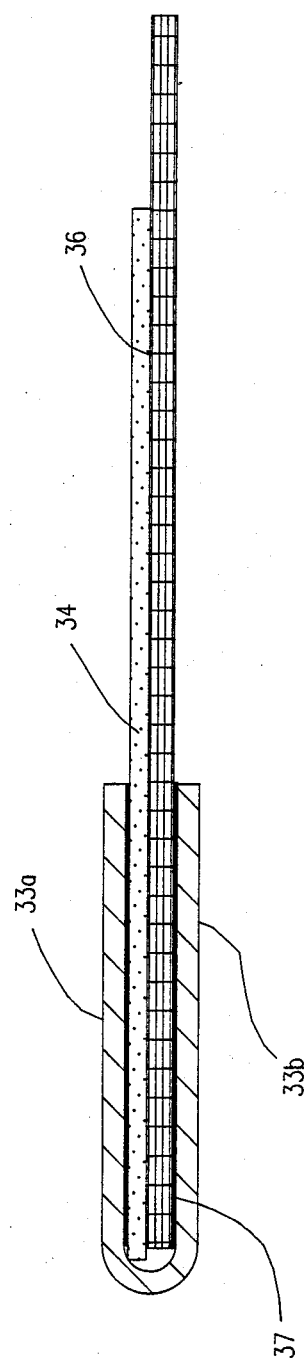
FIG. 3 shows a cathode module edge in cross-section and after crimping.

Referring to FIG. 3, a section only of the cathode frame edge is shown in cross-section. By folding over, e.g., by crimping, an upright frame edge 33a has been folded nearly into contact with a horizontal frame edge 33b. Interposed between these edges 33a and 33b is a sheet cathode 34 having a metal support member, or grid, 36 embedded therein. The sealant 37 within the U-shaped junction of the edges 33a and 33b, assists in providing an electrolyte-resistant seal for the sheet cathode 34 at the U-shaped juncture.

Figure 4:
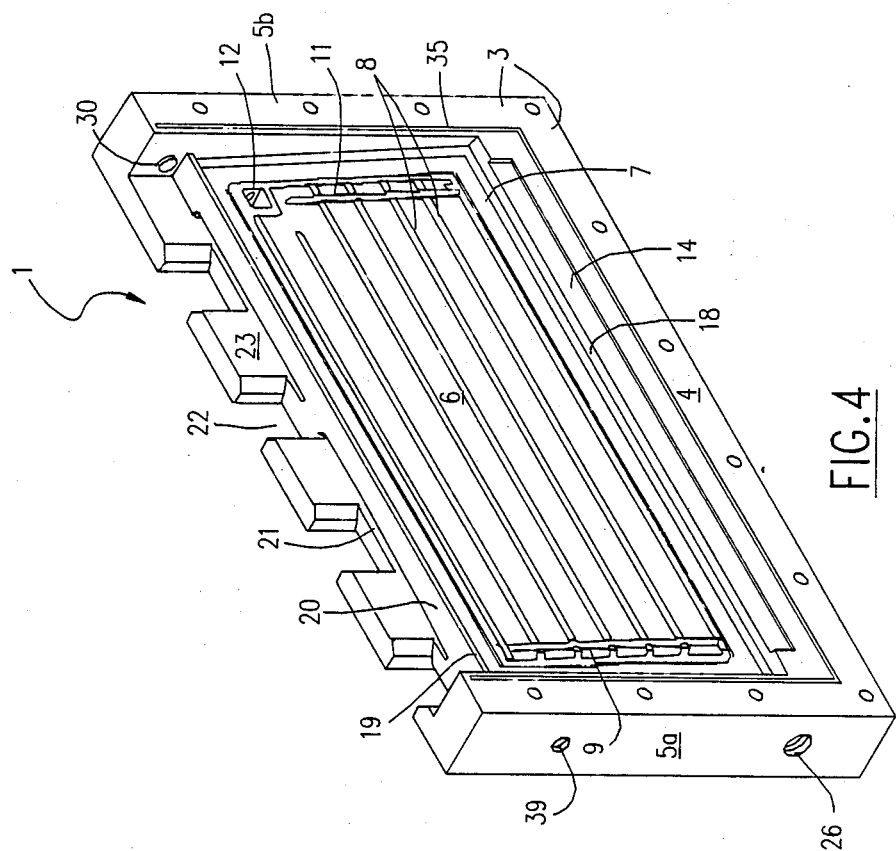
FIG. 4 depicts a cell body section on the front, cathode-facing side.

FIG. 4 shows the cathode-facing side of the cell body section 1 in greater detail. This cell body section 1, has a frame member 3 formed from a bottom cross-member 4 and upright frame posts 5a, 5b. Between the posts 5a, 5b is a wall-like face 6 surrounded circumferentially by a recessed groove 7. Air channeling or directional elements 8, shown as ridges, extend across the face 6 from an air plenum chamber inlet 9 to an opposite, and parallel air plenum chamber outlet 11. Likewise the face contains a lug recess 12 for receiving a cathode lug, not shown. The air channeling elements 8 can serve not only as air directional elements 8 but also to limit the distance of travel for the sheet cathode 34 toward the face 6 of the ell body section 1. Although such air channeling elements 8 are consistently shown as ridges, it is to be understood that other structure usually used in combination with such ridges is contemplated, e.g., air channeling grooves cut into the face 6 or expanded plastic mesh laid along the face 6.

Referring back again to FIG. 1, the cell body section 2 is equipped with an electrolyte feed slot 13 which is adequate for feeding sufficient electrolyte to the cell. In contrast, the cell body section 1 of FIG. 4 contains no electrolyte feed slot, but does have on the bottom cross member 4 a recessed electrolyte feed depression 14 which mates with the similar depression of the cell body section 2 in FIG. 1 to form an electrolyte plenum from which electrolyte feeds through to the cell. The FIG. 4 cell body section 1 has a continuous U-shaped O-ring 35 within a recessed groove in the facing of the posts 5a, 5b and bottom cross-member 4. This O-ring provides a liquid tight seal when this cell body section 1 is in firm contact with an adjacent cell body section, such as the cell body section 2 of FIG. 1.

The side of the post 5a of the cell body section 1 shown in FIG. 4 contains an electrolyte return outlet 26 connecting with an interior electrolyte return cavity, not shown. Upwardly therefrom on the post 5a is an air feed port 39 connecting from air supply means, not shown, to the air plenum chamber inlet 9. This cell body section 1, as is the cell body section 2 of FIG. 1, is equipped with a lower ledge 18 and opposite upper ledge 19 with there being slots 21 on the top face 20 of the upper ledge 19 for containing cathode holding elements, not shown. On the top face 20 of the upper ledge 19, through the far frame post 5b is an aperture for anode connection 30. When an anode is in place, this aperture 30 permits electrical connection, as with a connecting stud, not shown, from outside the cell to an upper cross-member of an anode cage 41. The connecting stud can have an outside O-ring seal in a beveled groove, all not shown, at the far side of the post 5b Along its top, the cell body section 1 also contains electrolyte return slots 22 and upright post members 23.

Figure 5:
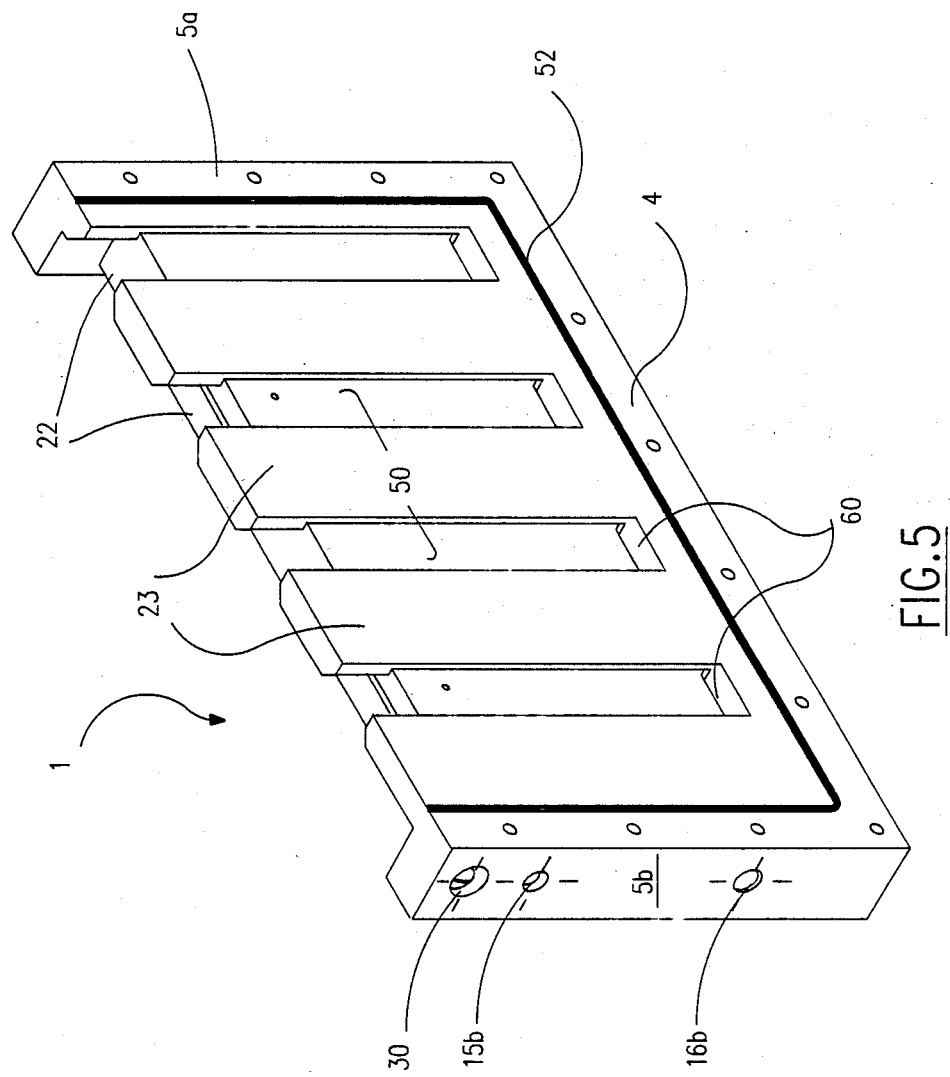
FIG. 5 shows the back electrolyte return side of a cell body section.

Referring then to FIG. 5, the cell body section 1 of FIG. 4 is shown from the back electrolyte return side. Thus, between the upright post members 23, the electrolyte return slots 22 open into electrolyte return channels 50. These channels 50 terminate downwardly in electrolyte return apertures 60 which feed into an interior conduit, not shown, connecting through the far frame post 5a to the electrolyte return outlet 26 of FIG. 4. On the near frame post 5b, from the top, the post 5b contains the aperture for anode connection 30 and just below, the lug access aperture 15b providing for connection through the post 5b to a cathode lug recess, not shown. Lastly, towards the bottom of the post 5a there is an air exhaust port 16b.

The back electrolyte return side of the cell body section 1 is also provided with an O-ring 52 seated in a U-shaped groove extending down the posts 5a, 5b and across the cross-member 4. Such O-ring 52 provides a liquid tight seal when the backside of the cell body section 1 is abutted against a member such as an end plate, i.e., the bulkhead 40b of FIG. 1, or abutted against the electrolyte return side of an opposing cell body section 2 such as shown in FIG. 1. Thus, the backside of the cell body section 2 of FIG. 1 is likewise equipped with electrolyte return channels 50 connecting with electrolyte return apertures 60. Further in this regard, the back of the cell body section 2 in FIG. 1 is the same as the back side of the cell body section 2 excepting that the U-shaped groove for receipt of an O-ring 51 may be dispensed with.

Figure 6:
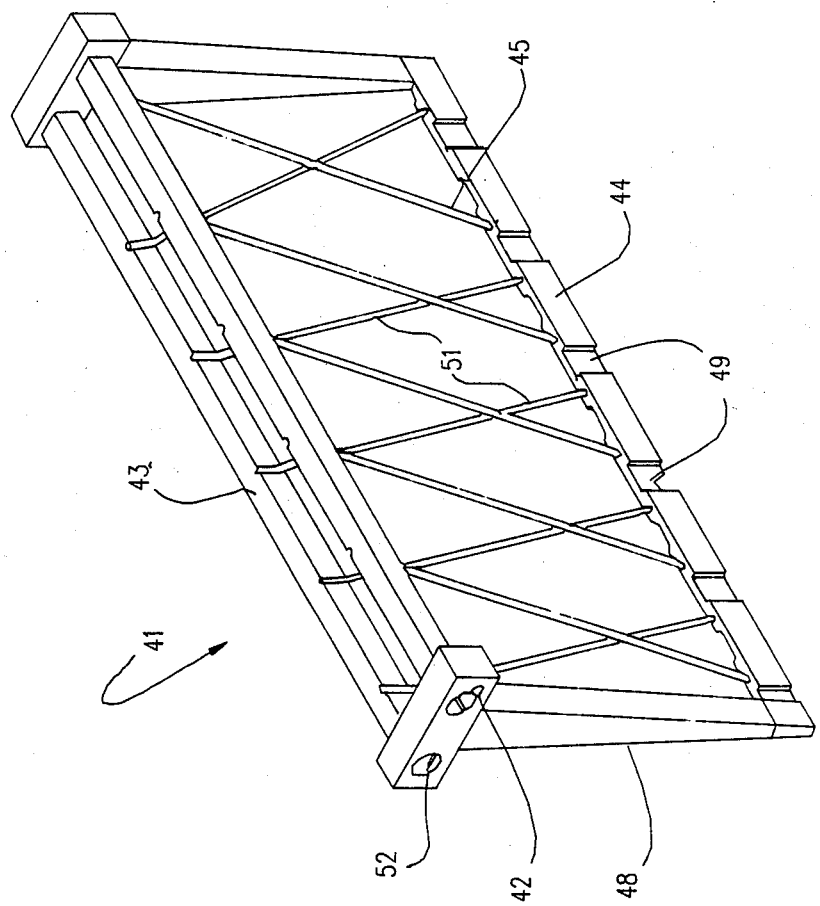
FIG. 6 is a perspective view of an anode cage.

Referring then to FIG. 6, a depiction in greater detail of an anode cage 41 is shown. The open topped anode cage 41 has two parallel upper cross members 43, spaced apart one from the other, and extending between end sections 48. The end sections 48 are fastened by screws 52 to the cross-members 43 and one end section 48 contains an electrical connection aperture 42 through which electrical connection can be made to an upper cross-member 43. Such electrical connection will continue through the aperture for anode connection 30 in the frame post 5b of the cell body section 1 as shown in FIG. 5. At the tapered ends of the end sections 48, a lower cross-member 44 extends therebetween. This lower cross-member 44 contains notches 49, which are staggered on one side of the cross-member 44 to the other, and serve as a feed manifold for electrolyte feed. This lower cross-member 44, as well as the end sections 48, also serve as compression members, as will be discussed more particularly hereinbelow. The lower cross-member 44 can be structured to fit at least partially into the electrolyte plenum created by the recessed electrolyte feed depressions 14 from each of the cell body sections 1 and 2 of FIG. 1 when such sections are brought together to form a cell.

Although the end sections 48 and lower cross-member 44 are usually of insulating material, each upper cross-member 43 can be electrically conductive. They can be in electrical contact with cage bars 45 which extend from each upper cross-member 43 to the lower cross-member 44. The cage bars 45 are however in large part made dielectric, as by polymer coating, to fix the electrolyte gap between cathode and anode substantially with dielectric material to avoid short circuiting. To provide sufficient electrical contact for conductivity with a wedged shaped metal anode, not shown, the cage bars 45 45 are angled to the vertical. Initially, they are angled in the plane of the V-shape of the anode cage 41, i.e., the most typically 3°–25° angle to the vertical discussed hereinabove. They can however also be angled at other than 90° to the lower cross-member 44, i.e., angled to the vertical in the plane of the end sections 48 as shown in the FIG. 6. This angle to the plane of the end sections 48 may typically be within the range of from about 5° to about 40°, which angled condition is the preferable positioning. As shown in this FIG. 6, the cage bars 45 from one upper cross-member 43 to the lower cross-member 44 can be angled in one direction and the cage bars 45 from the other upper cross-member 43 to the lower cross-member 44 can be angled in an opposite direction. Angled cage bars 45 can lead to enhanced uniformity of anode solution across the anode face coupled with a desirably level gravity feed of the anode. Although the cage bars 45 have been shown as straight line bars 45, other configurations are contemplated, e.g., zig-zag shape or expanded metal shapes. Moreover, although the cage 41 has been shown V-shaped, other cross-sectional shapes are contemplated. For example in a cell pack adjacent a bulkhead, e.g., the cell of FIG. 1 but with the cell body section 1 removed, leaving only the bulkhead 40b a flat, vertical side of a cage 41 may be adjacent the bulkhead 40b, and such side can be minus any cage bars 41. The anode 46 for such a cage 45 can have a continuous flat side facing the bulkhead 40b and thus have only a single angled side in contact with the one set of cage bars 45.

Referring still to FIG. 1, cell assembly can be initiated by placing a modular cathode 31 into the cell body section 2. Before this, the resilient, typically elastomeric "picture frame" gasket 29, such as a low durometer or closed cell EPDM, neoprene or vinyl gasket will be placed in the circumferential recessed groove 7 surrounding the face 6. The modular cathode 31 will then be placed such that its frame bottom edge 32d abuts the cell body section 2 lower ledge 18 and the cathode frame top edge 32c is placed under the upper ledge 19 of the cell body section 2. Cathode securing means, shown as U-shaped clips 24, can then be inserted, one leg into the slots 21 and the other leg across the cathode frame top edge 32c of the cathode frame 32. These clips 24 can be resilient, spring-like clips 24 and thereby compress the top edge 32c against the resilient elastomeric cathode gasket 29.

In similar manner, a modular cathode 31 is placed in the cell body section 1. The cell body sections 1 and 2 are then brought together and can be joined to each other, e.g., by tie bolts connecting between the posts 5a, 5b and bottom cross-members 4 of the body sections 1 and 2 through the appropriate apertures 28. An anode case 41 can be inserted between the two cathode modules 31 such that the cage upper cross-members 43 rest on the upper faces 20 of the upper ledges 19 of the body sections 1 and 2. Also, the anode end sections 48 will contact the cathode upright frame edges 32a,b while the anode lower cross member 44 will contact the cathode frame bottom edge 32d. It is preferred that the cathode frame bottom edge 32d and the anode lower cross-member 44 are matched in height although other arrangement is contemplated, e.g., a taller cross-member 44. When these are matched, the anode 46 will gravity feed to the lowermost region of the sheet cathode 34 and thereby provide enhanced utilization of the full surface of the sheet cathode 34.

As the body sections 1 and 2 are brought firmly together, force is thus transmitted to the cathode frame bottom and upright edges 32a,b and d by means of their contact with the anode end sections 48 and lower cross-member 44. More particularly, the lower cross-member 44 will press against the frame bottom edge 32d. The anode end sections 48 then press against the upright edges 32a and b. As discussed hereinbefore, the frame top edge 32c is pressed into place with securing mean 24. Thus, a compression seal around all of the edges of the cathode frame 32 is provided for each modular cathode 31 and the anode cages 41 are each crucial compression members for sealing the modular cathodes 31. Moreover, in such compression sealing, the modular cathodes 31 are sealed at the same time, e.g., as tie bolts between bulkheads are tightened. It will be appreciated that the upper cross-members 43 of the anode cages 41 are not pressure members but merely rest upon the upper ledge top surfaces 20 of the cell body sections 1 and 2. After this compression sealing, an anode 46 can then be inserted in the open top of each anode cage 41 and suitable connections for electrolyte, air and electrical current flow can be made. The backsides of the cell body sections 1 and 2 may be juxtaposed with additional cell body sections or with end plates, i.e., the bulkheads 40a, 40b.

The cell bodies 1 and 2 can be made of any material that is chemically resistant to the electrolyte, usually a hot alkali solution, such as of sodium or potassium hydroxide. Useful materials of construction include ceramics, metals such as nickel, as well as plastics including chlorinated polyvinyl chloride and polyphenylene oxide blends with polystyrene, and also including combinations of the foregoing. The cell bodies 1 and 2 are usually prepared in sections as shown for later insertion of modular cathodes 31 and an anode cage 41. Other elements that may be inserted in the cell bodies can include fluid flow manifolds. For example a tubular, hollow insert can be placed in an electrolyte feed conduit or plenum. A multitude of holes drilled in the insert, facing the electrolyte feed slot 13 will direct electrolyte on into the cell. The back pressure developed in the insert can enhance a uniform electrolyte feed along the feed slot 13.

In the usual construction of the modular cathodes 31, a frame 32 having upright frame edges 33a and horizontal frame edges 33b will be prepared from malleable copper, but use of other materials such as nickel is also contemplated. Copper, and particularly annealed copper for malleability, is preferred to provide a folded, crack-free cathode frame 32. After annealing, the frame 32 is then usually cleaned by conventional acid etching technique. The frame is thereby prepared for coating. It is contemplated that the coating can be by any conventional technique for applying a metal to the metal substrate without deleterious affect to the substrate, such as plasma spraying. Thus coating of malleable copper should retain the desirable characteristic of malleability. With the preferred copper frame, the coating is virtually always plating and this will usually be silver electroplating, although bonded composite metals can also be useful. However, other plating metals, with or in place of silver electroplating, such as gold or lead electroplating, can be used. With the representative electroplating, a pore free plate is desired to protect the underlying copper frame from attack by electrolyte. Such resistance will generally be achieved with a silver plate thickness of from about 0.2 to about one millimeter.

The resulting plated frame 32 is then prepared for receiving a sheet cathode 34 plus grid 36. This member, which can be preformed, will be of planar shape and will usually consist of a grid 36 or a screen of woven wire cloth, or expanded metal or fiber metal having an extensive void volume, so as, for example, to permit ready access of air or electrolyte to the sheet cathode 34. Regardless of construction, such perforate member will usually be referred to herein simply as the "grid" 36. The metal of the grid 36 may be silver, or silver plated nickel, or silver plated copper, possibly with a strike such as a nickel strike. It is advantageous for cell efficiency that the grid 36 be a screen of silver plated copper wire which may be nickel plated, and preferably nickel plated with a silver plate top layer. The copper wire, typically of from about 0.1 to about 0.2 millimeter diameter, will usually be in woven form. Particularly when used in an assembly such as shown in FIG. 2, the resulting grid 36 can be placed in the cathode frame 32, so as to come almost to the angled edges formed by the upright and horizontal edges 33a,b of the frame 32.

This grid 36 is usually preformed with the sheet cathode 34, and this operation can include sintering, e.g., at a pressure above about 1000 psi (70 atm.) and at a temperature above about 250° C., as will be described more particularly hereinbelow in connection with the examples. The cathode 34 will be of a porous sheet type construction, the grid 36 thereby assisting in the mechanical strength of the overall cathode structure upon assembly. For imparting unusual strength to the cathode structure in the frame assembly, a grid 36 is used on each side of the cathode 34, i.e., the cathode 34 is "double gridded". Although such double gridding is useful, it is most advantageous for efficient cathode operation that no grid internal to the cathode 34 be used. Thus there will be no hydrophilic bulk metal internal to the sheet cathode 34. Useful cathodes 34 include those prepared typically as a carbon/polymeric binder matrix of hydrophobic polymer. The hydrophobic polymer will generally contribute from about 10 to about 50 weight percent of the matrix. Most always this will be a catalyzed carbon matrixed with particles of halocarbon polymer binders. Generally the carbon is very finely divided, e.g., has particles within the range of from about 0.01 to 0.01 micron and the halocarbon, such as a fluorocarbon polymer which can be in mixture with other polymeric substance, will also be finely divided. Polymer particles less than one micron, e.g., having size within the range of from about 0.2 to one micron, can be serviceable for the halocarbon polymer. The carbon in the matrixed material can be activated such as by a platinum catalyst. Typical such cathodes 34 have been disclosed for example in U.S. Pat. No. 4,354,958. The cathode structure when double gridded and present in the completed frame assembly, although not entirely inflexible, will have unusual ruggedness and rigidity as well as enhanced current distribution.

It is also contemplated to use as a layer for the sheet cathode 34 a thin coating which can assist in the economical start-up of the cathode without undesirable start-up procedure, when placing the cathode into service. For convenience, this layer will sometimes be referred to herein as a "quick-start" layer and an electrode using the layer as a "quick-start electrode". A suitable quick-start layer can be prepared from an active carbon, preferably a low ash content carbon or a deashed carbon. The carbon can be deashed by contact with an aqueous alkali, e.g., sodium hydroxide or equivalent alkali, and more usually aqueous sodium hydroxide having a sodium hydroxide concentration of from about 28 to about 55 weight percent. Such deashing operation has more particularly been disclosed in U.S. Pat. No. 4,379,077. Subsequently the low ash content or deached active carbon particles can be catalyzed, for example by contact with a precursor of a precious metal catalyst, and will generally have from about 5 to about 15 weight percent of catalyst, basis weight of the quick-start layer. Suitable activating catalysts include platinum catalysts as well as the macrocyclic group of catalysts including cobalt tetramethoxyphenylporphyrin.

The carbon particles of the quick-start layer will typically have particle diameters within the range of from about one micron to about 100 microns and surface area of from about 500 to about 1500 square meters per gram of particles. The layer will generally be prepared from catalyzed active carbon particles, e.g., containing from about 5 to about 15 weight percent of catalyst, basis weight of said layer, in mixture with from about 10 to about 30 weight percent of hydrophobic polymeric binder. Serviceable such polymeric binders have polymer particles of size less than one micron, e.g., have size within the range of from about 0.2 to one micron. Such binders have been mentioned hereinabove and will most often include fluoropolymer binder, e.g., polytetrafluoroethylene (PTFE). There can thus result a catalyzed and low ash active carbon/PTFE matrix which can be coated as a layer on the sheet cathode by any means suitable for depositing finely divided particulate material onto a substrate.

At this point in the manufacture of the modular cathode 31, the assembly includes the open frame 32 and the gridded or more usually double gridded, sheet cathode 34. If there are breaks 38 in the upright frame edges 33a, such as at corners, it can then be useful to apply a two-sided adhesive tape at the break. Useful tapes include acrylic, EPDM and vinyl tapes. It is also useful before folding of the frame to apply a sealant 37 along the frame 32 at the perimeter of the sheet cathode 34. Virtually always a bead of sealant 37 will be run along the frame edge over the cathode and grid edge. Conductive or non-conductive sealants may be utilized, but it is advantageous that a non-conductive sealant be used for economy. Serviceable such sealants include long life sealants, and preferably such are of the single component. elastomeric type that can be cold applied and simply air cured. These can include neoprene as well as EPDM mastics. In the referred crimping of the frame edges 33a,b, compression can provide a hermetic, caustic tight seal for the cathode frame 32 without either metallurgical bonding or intrusive members such as bolts and screws.

It is however to be understood that other framing and fastening techniques for providing a tight seal cathode 32 around the sheet cathode 34 are contemplated. Thus the cathode grid 36 can be welded to the frame 32, e.g., by resistance welding, or the grid 36 can be bonded to the frame 32, such as with a conductive epoxy sealant, or be affixed by soldering or resistance brazing. Riveting might also be useful, usually with welding and/or sealing, but is not preferred. In such arrangements, as well as with crimping, it is also contemplated to use a simple bottom frame 32 and overlay the cathode 34 and grid 36 thereon, with or without affixing the overlay to the frame, and then place a separate top frame 32 on the overlay. Thus, a "sandwich" construction, as opposed to a U-shape frame is prepared. Furthermore, it would be possible to start with a solid bottom frame 32, perforate the center area of the frame sheet and overlay the perforate area with the sheet cathode 34, topped off with a grid 36. The edge of, the frame sheet could be left solid and it could be bent over and crimped to prepare the modular cathode 31. It is to be also understood that where practicable a grid 36 could be first placed in a frame 32 and alternatively affixed thereto, such as soldered or brazed, and then the sheet cathode 34 can be placed on the grid 36 as a separate overlay. By these various means it is thereby possible to assemble a modular cathode 31 which will have efficient electrical distribution as well as a continuous, mechanically protected joint, i.e., a mechanically supported joint of desirable integrity.

The anode cage 41 can have elements, such as cage bars 45 and upper cross-members 43, prepared from an electrolyte resistant metal such as nickel, silver, or silver and/or nickel-containing metals or coated metals, e.g., silver coated copper, where electrical conductivity is desired. In addition to plated metals, diffusion bonded or explosion bonded composite metals may also typically be used. The cage 41 can also have non-conductive elements, Prepared from materials such as plastics, e.g., chlorinated polyvinylchloride, polysulfone, or polytetrafluoroethylene, where electrical conductivity is not desirable. The cage bars 45 of the anode cage 41 can serve to provide the anode to cathode gap for electrolyte and thereby serve to provide spacing between the anode 46 and the sheet cathode 34. This electrolyte gap can be fixed with dielectric cage bars 45, that may be dielectric on the cathode side but may be electrically conductive e.g., show exposed metal, on the anode side. The bars 45 will thus be used as current collectors in contact with the anode 46.

In assembly, as mentioned hereinabove, cell body segments can be brought together by usual mechanical means, such as tie bolts. No separate, independent fastening of individual elements, e.g., gluing or soldering of the cathode module 31 to the frame member 3, is thereby necessary. The O-rings can provide liquid tight seals, although other sealing means including molded-in-place gaskets such as silicone caulking could also be used. By the use of means such as tie bolts, interconnected cell elements can be maintained under sufficient pressure to provide for all necessary electrolyte and air seals. The bulkhead-to-bulkhead compressive pressure can be transmitted readily through the anode cage 41, whereby the anode 46 itself may be readily insertable or removable from the cage 41 without cell compression adjustment.

The following examples show ways in which the invention has been practiced but should not be construed as limiting the invention. In the examples, all parts are parts by weight unless otherwise specified. In the examples air is used in cell operation, but it is to be understood that other serviceable materials exist, e.g., more concentrated oxygen, and can be useful in the present invention.

EXAMPLE 1

An air cathode is prepared by first catalyzing 2.14 weight parts of a commercially available, steam activated acetylene carbon black with 0.25 weight part of catalyst of cobalt tetramethoxyphenylporphyrin in acetone. The resulting catalyzed carbon black is heat treated at 800° C. in an inert gas. Equal amounts of an ethylene-propylene copolymer and polytetrafluoroethylene, together forming a binder, are added to the catalyzed carbon black, in the ratio of 70 weight parts catalyzed carbon to 30 weight parts binder, and the resulting mixture is filtered onto a filter paper support thereby preparing a bonded carbon layer. Silver plated nickel mesh, of 0.013 centimeter (cm.) diameter wire and having 20×10 mesh wires per cm., is placed on the resulting layer and lightly pressed at approximately 100 psi (7 atm.). The filter paper is then wetted and removed, the single-gridded cathode turned over, and a second nickel mesh grid is placed under the light pressure on the second side. This double-gridded layer is then pressed flat at 2000 psi (140 atm.) at 115° C., the pressure is reduced to approximately 500 psi (35 atm. and the assembly is sintered at 300° C. under an inert atmosphere of argon, thereby preparing a double-gridded carbon black electrode.

Separately, quick-start catalyzed active carbon layer is prepared by blending, with binder, a catalyzed deashed "RB carbon", in a ratio of 90 parts carbon to 10 parts catalyst, which has been more particularly described in U.S. Pat. No. 4,354,958, and filtering in isopropyl alcohol. The mixture is filtered on to one of the gridded surfaces of the double-gridded carbon black electrode and press-dried at 300 psi (21 atm.) and 100° C. Final pressing proceeds at 2000 psi (140 atm.) and 115° C. under an inert atmosphere of argon. This provides a quick-start layer of about 0.5 mm. thickness.

An annealed copper frame, of approximately 14×30 cm. outer dimensions and having an 11×28 cm. inner aperture is cut from a single copper sheet. A copper lug is soldered to one corner thereof, and this assembly is then acid etched and silver plated by standard etching and electroplating technique. The resulting plated article had a silver plate thickness of about 2 mils (0.05 mm.).

A ninety degree angle is placed in the copper to form an "open" picture frame such as shown in FIG. 2. The double-gridded cathode is then laid into the open frame. The double gridded cathode has sufficient dimension to leave an about 3 millimeter (mm.) gap from the edge of the cathode to the edge of the frame, which edge is marked by the upright frame edges. In this gap around the total perimeter of the cathode, there is then placed a bead of a single component, air-drying, elastomeric non-conductive sealant. Additionally, at each of the four corners there is placed on the frame over the corner of the cathode a two-sided sticky acrylic tape. The cathode frame is sequentially crimped in a hemming die and then flattened firmly around its total perimeter at a final pressure of 0.2 ton per square inch (28 kg/cm$^2$) so that the frame can subsequently provide for balanced current distribution around the total edge of the grid.

Cell body half sections, as more particularly shown in FIGS. 1 and 4, are machined from a block of plastic prepared from polyphenyleneoxide blended with polystyrene. These sections have faces angled back at 3° from the main plane of the section. Into the recessed groove around the face of each cell body there is set a "picture frame" gasket consisting of low durometer, closed cell rubber. The air cathode module is then placed on the cell body face, with the lug connection of the module fitting into the appropriate lug recess in the face, and the cathode module being pressed against the picture frame gasket. For maintaining the top edge of the cathode in place in each cell body section, nickel U-clips, six for each cathode, of 0.64 mm. thickness, are forced into the upper cell body frame slots and across the frame top edge of the cathode module. The module is thereby firmly held in place, across its top edge. For electrical connection, a threaded copper stud is then torqued through the cathode connecting outlet in the cell body side post into the lug of the cathode module. The copper stud is sealed with an O-ring.

Two copper beams 9.5 by 9.5 by 276 mm. are selected to serve as anode cage upper cross-members. The beams are each center punched at 51 mm. intervals and 2 mm. thick copper wire is press fit into each punched slot. Each wire will serve as a cage bar, providing five cage bars per side, and each bar is 146 mm. in length. The beams and the wires are then silver plated by standard silver electroplating technique to provide a silver coating thickness of about 2 mils (0.05 mm.). The silver plated wire is next coated by dip coating in an air dry insulating coating having a xylol solvent, which coating is cured at room temperature. Each coated wire is scraped to expose the silver underlayer, on one linear section, such that the major circumferential portion of the wire maintains the insulation coating. Each cage bar is bent at a 21° angle to the vertical as established by the cage end section.

A U-shaped frame of chlorinated polyvinyl chloride, as shown in FIG. 6, having V-shaped end sections and a notched lower cross-member, is used for the balance of the anode cage. The beams, with angled, dependent cage bars, are then fastened to the side sections using silver-plated screws. The dependent cage bars are then press-fit into slots in the lower cross-member.

The two cell body half sections bearing the modular cathodes are brought together, with the cathodes being in face-to-face relationship. An O-ring seal is first used in the U-shaped groove of the one cell body, in the manner as shown in FIG. 5. The joint between the two cell body sections is loosely tightened using tie bolts through holes in adjacent posts and lower cross-members of each frame.

The anode cage is inserted into the V-shaped aperture existing between the cathodes. Upon proper insertion, the electrical connection aperture in the anode cage will be in alignment with the anode connection outlet in the cell body half section, e.g., the outlet 30 of FIG. 4. A copper stud is then torqued through the outlet and aperture into the anode beam to provide electrical connection to the anode cage.

When the tie bolts are torqued to a firm seal, the anode cage pressure-fits against the modular cathodes and seals the portions of the cathodes not clipped to the cell body. The resulting assembled cell is then ready for completing connections, e.g., air and electrolyte, and then for use as will be now described hereinbelow.

EXAMPLE 2

A wedge-shaped aluminum anode measuring 27 by 23 by 1.2 cm. and tapering over its lower 9 cm. to a point is inserted through the open top of the anode cage of Example 1. The anode used is 3N8 aluminum which is 0.9998 purity aluminum. The wedge-shaped anode faces come into contact with the exposed silver surface of the cage bars. All other features of the cell are the same as in Example 1 except the modular air cathode does not contain a quick-start layer.

Air, electrolyte and electrical connections to and from the cell are made at the junctions as noted in accordance with the description presented hereinabove in connection with the Figures. The electrolyte used is 5 molar potassium hydroxide and it is introduced at a flow rate of approximately 1.5 grams per minute. Air at room temperature, and soda lime scrubbed to less than 2 ppm. carbon dioxide, as determined by IR gas analysis, is introduced into the cell at a flow rate of 13.8 liters per minute. Under these operating conditions, during a time on line of 7.5 hours, this cell provides the following:

| | |
|---|---|
| Voltage: | 0.89 Volt |
| Load: | 400 mA/cm$^2$ |
| Total Current: | 240 Amps |
| Total Power: | 214 Watts |

EXAMPLE 3

The apparatus of Example 1, using just one cell, is again used, but is in use as described in Example 2, e.g., no quick-start layer is employed for the modular cathode. Also, the anode used is BDW alloy of Alcan Aluminum Corp. Operating data for the cell are as follows:

| | |
|---|---|
| Time on Line: | 2 hours |
| Voltage: | 1.36 Volts |
| Load: | 400 mA/cm$^2$ |
| Total Current: | 240 Amps |
| Total Power: | 326 Watts |

EXAMPLE 4

The cell of Example 1, but as modified and operated as described in Example 2 is again tested. The anode used is the BDW alloy of Alcan Aluminum Corp. Operating data for the cell is as follows:

| Current Density mA/CM$^2$ | Voltage | Total Current | Total Power |
|---|---|---|---|
| 100 | 1.567 | 60 | 94 |
| 200 | 1.49 | 120 | 178 |
| 300 | 1.43 | 180 | 258 |
| 400 | 1.35 | 240 | 324 |
| 500 | 1.26 | 300 | 378 |
| 600 | 1.15 | 360 | 414 |

We claim:

1. The method of making a unitized electrode assembly, which assembly is resistant to liquid penetration and comprises a metal frame for enclosing the peripheral edge of a gas-diffusion electrode in planar sheet form, which method comprises:

establishing a metal frame member having raised edge projections around the frame perimeter, the projections having breaks at frame corners, with said frame member conforming in shape to the peripheral edge of said electrode in sheet form;

placing said electrode in sheet form in said frame member with the peripheral edge of said sheet being placed nearly adjacent said raised edge projections;

taping said electrode with electrolyte-resistant tape at said corner breaks;

applying a bead of electrolyte-resistant sealant within said frame member along the base of said raised edge projections; and crimping said raised edge projections down into firm contact with said electrode tape and sealant.

2. The method of claim 1 wherein said electrode in sheet form in said frame is overlaid with a perforate metal conductor member.

* * * * *

UNITED STATES PATENT AND TRADEMARK OFFICE
CERTIFICATE OF CORRECTION

PATENT NO.  : 4,788,764

DATED       : December 6, 1988

INVENTOR(S) : Niksa et al

It is certified that error appears in the above-identified patent and that said Letters Patent is hereby corrected as shown below:

On the Cover Page:

Left hand column, Section [75] Inventors:  Delete Frank Solomon, Great Neck, N.Y.; Yury Genodman, Brooklyn, N.Y.; and Daniel P. Hagel, Willoughby, both.

Signed and Sealed this

Fourth Day of July, 1989

Attest:

DONALD J. QUIGG

Attesting Officer

Commissioner of Patents and Trademarks